United States Patent
Pullini (10) Patent No.: US 10,589,469 B2
(45) Date of Patent: Mar. 17, 2020

(54) METHOD FOR OBTAINING A WELDED JOINT BETWEEN ELEMENTS OF DIFFERENT MATERIALS, AND A HYBRID COMPONENT OBTAINED THROUGH THIS METHOD

(71) Applicant: C.R.F. Societa Consortile per Azioni, Orbassano (Turin) (IT)

(72) Inventor: Daniele Pullini, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 70 days.

(21) Appl. No.: 15/281,351

(22) Filed: Sep. 30, 2016

(65) Prior Publication Data
US 2017/0095971 A1   Apr. 6, 2017

(30) Foreign Application Priority Data
Oct. 5, 2015 (EP) .................................... 15188316

(51) Int. Cl.
*B29C 65/00* (2006.01)
*B29C 65/70* (2006.01)
(Continued)

(52) U.S. Cl.
CPC ............ *B29C 66/028* (2013.01); *B21D 22/02* (2013.01); *B21K 23/00* (2013.01); *B23K 26/361* (2015.10);
(Continued)

(58) Field of Classification Search
CPC ..... B29C 65/44; B29C 65/5057; B29C 65/70; B29C 65/02; B29C 65/08; B29C 65/64;
(Continued)

(56) References Cited

U.S. PATENT DOCUMENTS 4,562,104 A    12/1985  Maeda
7,667,158 B2 *  2/2010  Dance .................... B23K 15/08
                                                 219/121.66

FOREIGN PATENT DOCUMENTS

JP          S5329383 A    3/1978
JP         H08247371 A    9/1996
(Continued)

OTHER PUBLICATIONS

English Abstract for JP8247371A.
(Continued)

*Primary Examiner* — Camie S Thompson
(74) *Attorney, Agent, or Firm* — RMCK Law Group PLLC (57) ABSTRACT

A welded joint between at least one metal material element and at least one thermoplastic material element is obtained by pressing the elements against each other while applying heat. Contact surfaces of the metal material, which are in contact with the thermoplastic material, are provided with uneven surface portions having a distribution of asperities. With heat applied, the thermoplastic material fills spaces between these asperities and maintains this configuration after subsequent cooling, thereby improving strength of the joint. The uneven surface portions are obtained in a preliminary forming step of the metal material in a press mold, which is configured with a forming surface for generating the uneven surface portions by mechanical deformation and/or with a device for guiding a laser or electron beam. By this technique, hybrid components are obtained made of one or more elements of metal material between which a shaped component of thermoplastic material is interposed.

21 Claims, 7 Drawing Sheets

(51) Int. Cl.
| | |
|---|---|
| B23K 26/362 | (2014.01) |
| B32B 15/08 | (2006.01) |
| B21K 23/00 | (2006.01) |
| B21D 22/02 | (2006.01) |
| B29C 65/16 | (2006.01) |
| B29C 65/44 | (2006.01) |
| B29C 65/48 | (2006.01) |
| B29C 65/50 | (2006.01) |
| F16B 2/00 | (2006.01) |
| F16B 5/08 | (2006.01) |
| B23K 26/361 | (2014.01) |
| B29K 101/12 | (2006.01) |
| B29K 105/08 | (2006.01) |
| B29L 31/30 | (2006.01) |
| B29K 105/12 | (2006.01) |
| F16B 11/00 | (2006.01) |

(52) U.S. Cl.
CPC ........ *B23K 26/362* (2013.01); *B29C 65/1629* (2013.01); *B29C 65/44* (2013.01); *B29C 65/4815* (2013.01); *B29C 65/5057* (2013.01); *B29C 65/70* (2013.01); *B29C 66/022* (2013.01); *B29C 66/0222* (2013.01); *B29C 66/112* (2013.01); *B29C 66/1122* (2013.01); *B29C 66/131* (2013.01); *B29C 66/1312* (2013.01); *B29C 66/30322* (2013.01); *B29C 66/30325* (2013.01); *B29C 66/43* (2013.01); *B29C 66/5346* (2013.01); *B29C 66/54* (2013.01); *B29C 66/543* (2013.01); *B29C 66/545* (2013.01); *B29C 66/721* (2013.01); *B29C 66/7392* (2013.01); *B29C 66/742* (2013.01); *B32B 15/08* (2013.01); *F16B 2/005* (2013.01); *F16B 5/08* (2013.01); *B29C 66/7212* (2013.01); *B29C 66/72143* (2013.01); *B29C 66/73161* (2013.01); *B29C 66/7422* (2013.01); *B29C 66/74283* (2013.01); *B29C 66/863* (2013.01); *B29K 2101/12* (2013.01); *B29K 2105/08* (2013.01); *B29K 2105/122* (2013.01); *B29K 2105/124* (2013.01); *B29L 2031/3002* (2013.01); *F16B 11/006* (2013.01)

(58) Field of Classification Search
CPC ... B29C 65/72; B29C 66/30325; B29C 66/43; B29C 66/73161; B29C 66/7392; B29C 66/742; B29C 66/7422; B29C 66/74283; B29C 66/81423; B29C 66/929; B29C 66/8322; B29K 2101/12; B29K 2103/05; B29K 2103/10; B29K 2103/18; B29K 2103/42; B29L 2031/3002; F16B 5/08
See application file for complete search history.

(56) References Cited

FOREIGN PATENT DOCUMENTS

| | | | |
|---|---|---|---|
| JP | 2009226643 | A | 10/2009 |
| JP | 2011143539 | A | 7/2011 |
| JP | 2014046599 | A | 3/2014 |
| WO | 2009031632 | A1 | 3/2009 |
| WO | 2010020850 | A1 | 2/2010 |
| WO | 2011086984 | A1 | 7/2011 |

OTHER PUBLICATIONS

English Abstract for JP2009226643A.
English Abstract for JP2011143539A.
English Abstract for JP201446599A.
English Abstract for JPS5329383A.
English Abstract of Japanese Patent Application JPS5329383A taken from the World Patent Index database of Thomson Scientific, Mar. 25, 2013, 1 page.
European Search Report dated Mar. 29, 2016 for European Application No. 15188316.2, 4 pages.

* cited by examiner

METHOD FOR OBTAINING A WELDED JOINT BETWEEN ELEMENTS OF DIFFERENT MATERIALS, AND A HYBRID COMPONENT OBTAINED THROUGH THIS METHOD

CROSS REFERENCE TO RELATED APPLICATIONS

This application claims priority to European Patent Application No. 15188316.2 filed on Oct. 5, 2015, the entire disclosure of which is incorporated herein by reference.

FIELD OF THE INVENTION

The present invention relates to a method for obtaining a welded joint between elements of different materials.

PRIOR ART

Methods have been already proposed in the past for providing a welded joint between elements of different materials, in which the joint is between at least one element of metal material and at least one element of thermoplastic material, which have respective contact surfaces which are pressed against each other with a simultaneous application of heat, obtained for example with the aid of a laser beam. Methods of this type are also known in which the surface of the metal element which is to come in contact with the element of thermoplastic material has at least one uneven surface portion, with a distribution of asperities. Following the above mentioned application of heat a softening and eventually even a local melting of the thermoplastic material is generated, so that the latter fills the spaces between the asperities of the uneven surface portion of the metal element, and maintains this configuration after a subsequent cooling. In this manner, a welded joint is obtained having high strength characteristics.

Methods of the above indicated type are for example disclosed in WO 2009/031632 A1 and JP 2011 143539 A1. In the above mentioned known methods, the uneven surface portion on the contact surface of the metal element is obtained by dedicated operations, for example by a "writing" operation with the aid of a laser beam, or by sand-blasting, or also by etching operations. However, all the above mentioned operations imply various types of drawbacks and in particular they render practically impossible to apply this technology to industrial production lines and in particular to lines for production of components of motor-vehicle structures. Processing operations such as laser "writing" imply a too long cycle time. Processing operations such as sand-blasting introduce further problems in relation to the need of obtaining a clean and non-polluting work environment. Furthermore, each of these operations would imply the provision along the production line of a station dedicated to machining the contact surface of the metal element in order to obtain the required roughness characteristics. This would generate an unbearable drawback both from the point of view of the cost of the line, and from the point of view of productivity and also for the point of view of occupied space.

Heretofore, all the above mentioned problems have rendered the application of the above mentioned technology to industrial production lines, in particular in the field of production of components of motor—vehicles structures, not advantageous in real practice.

From document JP S53 029383 A a method of the above discussed type is known, in which the element of metal material is a shaped component of metal sheet, which is preliminarily obtained by a milling operation in a mill and in which the above mentioned uneven surface portion is obtained during the above mentioned milling operation in the mill.

OBJECT OF THE INVENTION

The object of the present invention is that of improving the known methods in particular in order to enable their practical use in industrial production lines with relatively simple and inexpensive means.

SUMMARY OF THE INVENTION

Similarly to the known methods, the method according to the invention provides a joint which comprises at least one element of metal material and at least one element of thermoplastic material having respective contact surfaces,
  wherein said contact surfaces are pressed against each other with simultaneous application of heat,
  wherein the contact surface of said at least one metal element has at least one uneven surface portion,
  wherein said uneven surface portion has a distribution of asperities,
  wherein said application of heat is such as to generate a softening of the thermoplastic material, whereby said material fills the spaces between the asperities of said uneven surface portion and maintains this configuration after a subsequent cooling. The method according to the invention is further characterized in that the above mentioned element of metal material is a shaped component of metal sheet, which is obtained in a preliminary forming step, by mechanical deformation in a press mould. Also according to the invention, the above mentioned uneven surface portion is obtained in said preliminary forming step for forming said element of metal material in said press mould.

Due to the above indicated features, the method according to the invention enables the application of the above mentioned technology for welded joining of elements of different materials to an industrial production line, in particular to a line for production of components of motor-vehicles structures, with no particular burden or complication in relation to the production means, since the roughness characteristics which are required for the contact surfaces are obtained by the same step in which each metal element is preliminarily formed.

According to a preferred feature, the mould which is used in said preliminary forming step for forming the sheet metal element is provided with a forming surface adapted to create said uneven surface portion by a mechanical deformation of the metal material and/or said mould is provided with a device for guiding and addressing a laser beam or an electron beam adapted to generate said uneven surface portion of the metal material by evaporation and subsequent solidification of the metal material, when the element of metal material is located within the mould.

The above mentioned uneven surface portion may be formed only on one face of said sheet metal element which is provided for coming in contact with said element of thermoplastic material, or it may be formed on both faces of said sheet metal element, as a result of a mechanical deformation of said sheet metal element in said mould, preferably according to an undulated shape with a substantially uniform thickness.

The asperities of said uneven surface portion may be of microscopic size (in the order of nanometers or micrometers) or of macroscopic size (in the order of millimeters). A case is also envisaged which combines both possibilities, wherein the uneven surface has asperities of macroscopic size obtained by mechanical deformation of said sheet metal element, on their turn these asperities having surfaces with secondary irregularities, of micrometric or nanometric dimensions, which are obtained by a laser beam or an electron beam.

According to an embodiment of the invention which is particularly important, the principle which is at the basis of the invention is exploited for providing a joint between elements of different metal materials, such as sheet elements of steel and aluminium. In this case, the joint comprises the two elements of different metal materials and at least one portion of thermoplastic material interposed therebetween. The contact surface of each of said metal elements which comes in contact with said interposed portion of thermoplastic material is provided with one or more uneven surface portions, obtained by mechanical deformation during the preliminary step for forming said elements of metal materials in respective press moulds. A joint of this type can also be provided as an additional joint with respect to mechanical connecting elements such as screws or rivets, in order to reduce the number of screws or rivets which are necessary for the connection.

By the method of the invention also hybrid components can be made which are constituted by one or more elements of metal sheet and on or more shaped panels of thermoplastic material.

In the definition of the present invention, both in this description, and in the annexed claims, the term "thermoplastic material" is used to indicate both any thermoplastic material which can be adapted to this purpose, and also a composite material with a thermoplastic matrix reinforced with fibres. This is noted herein since in particularly preferred embodiment of the invention, which can be adopted in all the solutions described herein, the above mentioned thermoplastic material is a composite material with a thermoplastic matrix reinforced with fibres, such as glass fibres or carbon fibres or kevlar fibres or the like. The fibres can also be nano-fillers and/or nano-fibres, but the preferred embodiment makes use of reinforcing fibres having dimensions in the order of millimeters or micrometers.

The present invention is also directed to a hybrid component obtained by the method described above, according to what is indicated in the annexed claims 18-21.

DETAILED DESCRIPTION OF SOME EMBODIMENTS

Further features and advantages of the invention will become clearly apparent from the description which follows with reference to the annexed drawings, given purely by way of non limiting example, in which.

Figure 1:
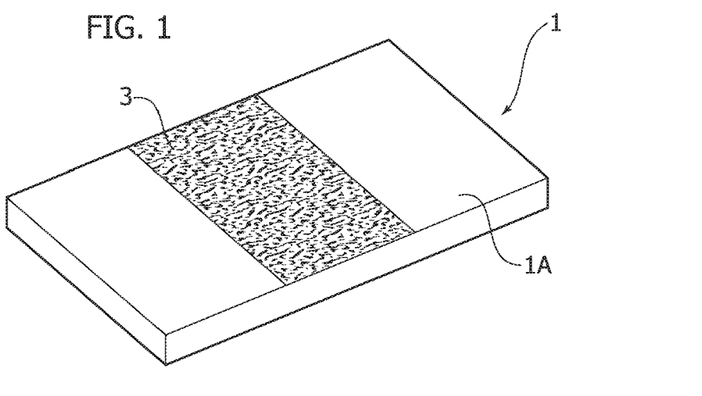
FIGS. 1-3 are diagrammatic views which show some basic principles of the invention which were already present in the prior art.
Figure 2:
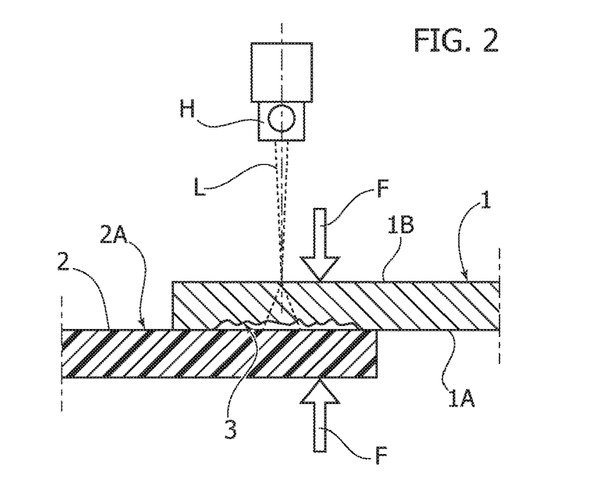
Figure 3:
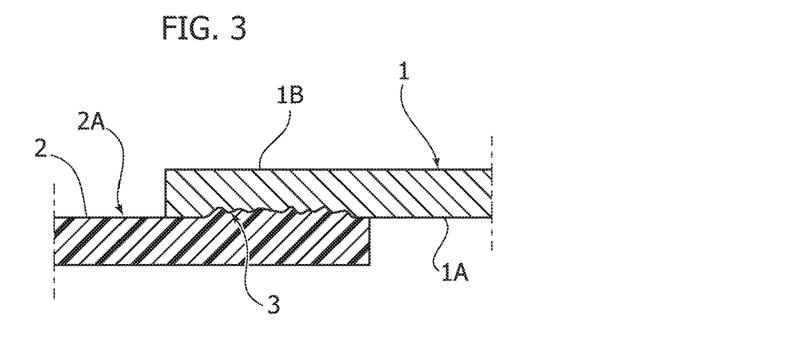

FIGS. 1-3 show the basic principles of a welded joint between an element of metal sheet 1, for example made of aluminium or steel, and a panel 2 of thermoplastic material. The sheet 1 and the panel 2 have respective planar contact surfaces 1A and 2A which are pressed against each other (arrows F) with the aid of any apparatus adapted to this purpose. The application of pressure along arrows F is carried out while heat is simultaneously applied to the joint by means of any heat source, in particular for example by means of a laser beam L focused by a laser head H which receives the laser beam from a laser generator of any adapted type. The laser beam L is focused on one face 1B of the metal sheet 1 located on the opposite side with respect to the contact surface 1A which is in contact with the panel 2 of thermoplastic material. The heat generated thereby is propagated by thermal conduction through the metal sheet 1 and reaches the panel 2 of thermoplastic material thus bringing it to a softening temperature and eventually to a local melting temperature which provides the welded joint.

According to the prior art, the contact surface 1A of the metal sheet element 1 is preliminarily machined in order to provide thereon one or more uneven surface portions 3 having a plurality of asperities whose heights may vary between values in the order of nanometers and values in the order of millimeters. The asperities of the uneven surface portion 3 are shown in FIGS. 2, 3 with enlarged dimensions, for clarity of illustration. During the joining operation, the heat generated by the laser beam L focused on face 1B of the metal sheet element 1 brings the thermoplastic material constituting the panel 2 to a softening temperature, eventually even with local melting, so that the thermoplastic material can fill the spaces between the asperities of the surface portion 3, while maintaining this configuration after a cooling thereof. In this manner, the welded joint has a greatly improved resistance against detachment.

FIG. 3 shows the welded joint at the end of the joining operation at an enlarged scale and in cross section. Also in FIG. 3, the dimensions of the asperities of the uneven surface portion 3 and the corresponding projections obtained on face 2A of the thermoplastic panel 2 have been greatly enlarged, for clarity of illustration.

In the methods of the above indicated type which have been used heretofore, the uneven surface portions 3 are formed on the element of metal material 1 by a preliminary processing operation, such as by etching or also by sand-blasting, or also by a laser "writing" operation. All these operations do not enable this technology to be applied to an industrial production line, such as for the production of components of motor-vehicle structures, since they would involve the introduction of stations dedicated to the above mentioned operations for machining the surface of the metal elements to be welded, with resulting increases in the production costs, in the dimensions of the production plant and in the length of the production cycle.

The present invention has located an efficient solution to the above mentioned problem starting from considering that, in the applications of greater interest, such as for instance in the case of the production of components of motor-vehicle structures, the welded joints to be obtained include at least one metal element, such as an element made of steel or aluminium, in form of a shaped component of metal sheet, which is preliminarily obtained by mechanical deformation in a press mould. The idea which is at the basis of present invention is that of exploiting this press moulding of the component of metal sheet for simultaneously obtaining the desired characteristics of the surface of the metal element which is to come in contact and welded with a cooperating surface of an element of thermoplastic material.

As indicated already in the foregoing, according to a preferred feature of the invention, the mould which is used in said preliminary forming step for forming the sheet metal element is provided with a forming surface adapted to create said uneven surface portion by a mechanical deformation of the metal material. Alternatively, or in addition to this solution, said mould is provided with a device for guiding and addressing a laser beam or an electron beam adapted to generate said uneven surface portion of the metal material by evaporation and subsequent solidification of the metal material, when the element of metal material is located within the mould.

The above mentioned uneven surface portion may be formed only on one face of said sheet metal element which is provided for coming in contact with said element of thermoplastic material, or it may be formed on both faces of said sheet metal element, as a result of a mechanical deformation of said sheet metal element in said mould, preferably according to an undulated shape with a substantially uniform thickness.

The asperities of said uneven surface portion may be of microscopic size (in the order of nanometers or micrometers) or of macroscopic size (in the order of millimeters). A case is also envisaged which combines both possibilities, wherein the uneven surface has asperities of macroscopic size obtained by mechanical deformation of said sheet metal element, on their turn these asperities having surfaces with secondary irregularities, of micrometric or nanometric dimensions, which are obtained by a laser beam or an electron beam.

As indicated in the foregoing, in a first embodiment, the press mould used for forming the component of metal sheet is configured so as to obtain, one or more uneven surface portions having the characteristics which are desired for an optimal joint by mechanical deformation, in the same forming operation of the component of metal sheet.

Figure 4:
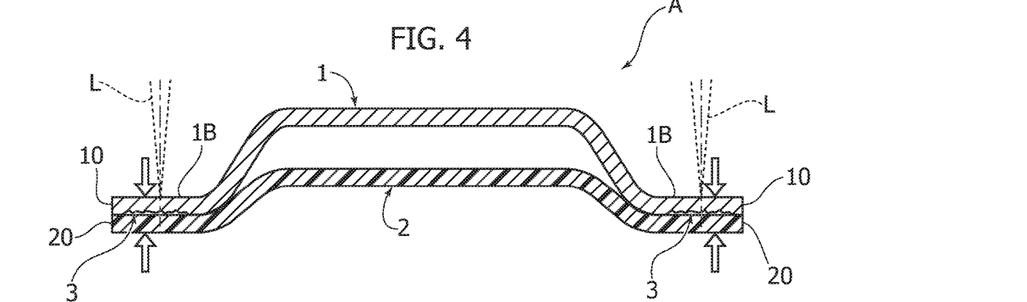
FIG. 4 is a diagrammatic view in cross-section of a component which can be obtained by the method according to the invention.

Also according to the invention, the above mentioned asperities of said uneven surface portion (3) have height and width values between a minimum value in the order of nanometers and a maximum value in the order of millimeters. FIG. 4 shows a first embodiment of the invention, in which a hybrid component A is obtained, which is constituted by one shaped element of metal sheet 1, such as steel or aluminium and one shaped panel of thermoplastic material 2 having respective flanges 10, 20 which are connected to each other by the technique shown in FIGS. 1-3, i.e. by pressing flanges 10, 20 against each other with simultaneous application of heat, such as with the aid of a laser beam L focused on face 1B of the element of metal sheet 1 opposite to the face which is in contact with the element of plastic material 2. The surface of the flanges 10 which is in contact with the element of thermoplastic material 2 is preliminarily formed with uneven surface portions 3 of the type visible in FIG. 1. Each of these portions has a distribution of asperities whose height values, in the case of the invention, are between values in the order of nanometers and values in the order of millimeters.

Figure 5:
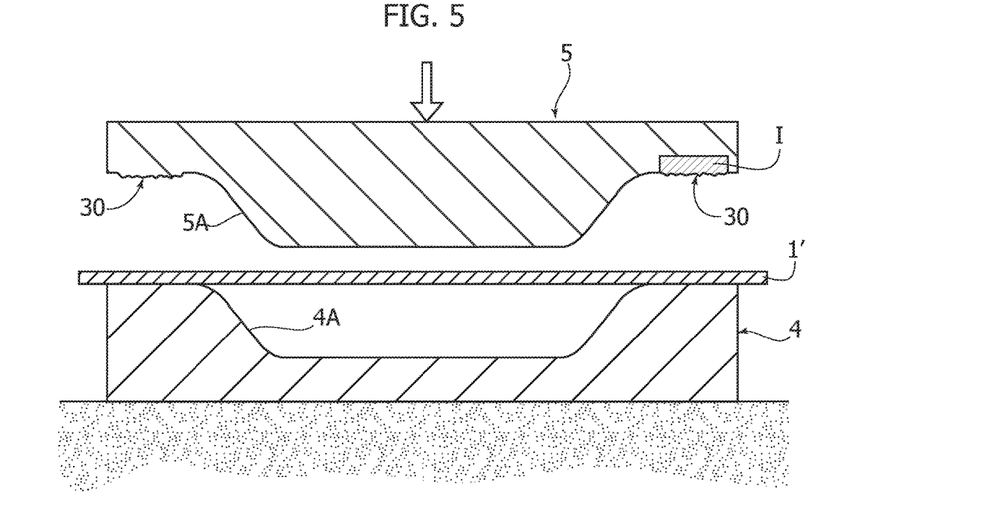
FIG. 5 is a cross-sectional view which diagrammatically shows one step of the method according to the invention.
Figure 6:
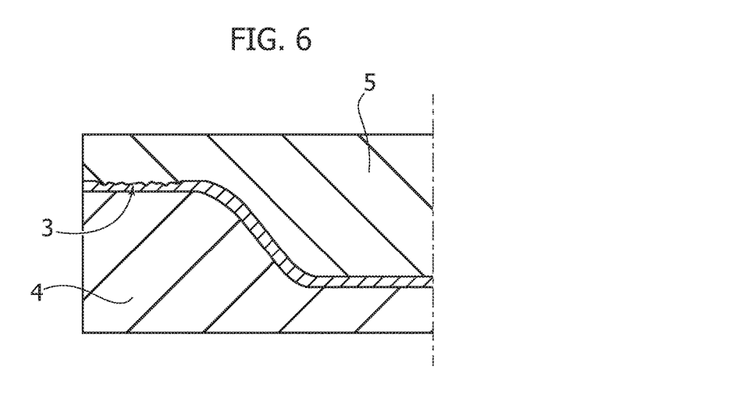
FIG. 6 shows a step subsequent to the step of FIG. 5 in the method according to the invention.

According to the invention, these uneven surface portions are obtained during the preliminary step for forming the component of metal sheet 1, which is diagrammatically shown in FIGS. 5, 6. FIG. 5 shows the planar metal sheet 1' from which the shaped component 1 is obtained. The metal sheet 1' is arranged within a forming press mould, diagrammatically shown in FIGS. 5, 6 which includes a lower mould element, or die 4 and an upper mould element, or punch 5. The two mould elements 4, 5 are movable relative to each other along the vertical direction, so that the upper mould element 5 is movable from a raised position, (shown in FIG. 5), in which the sheet 1' can be arranged above the die 4 or in which the sheet component 1 can be removed after forming thereof, and a lowered position, for forming the element 1. The die 4 has a surface 4A configured according to the profile to be imparted to the sheet element 1', whereas the upper mould element 5 has a surface 5A of a corresponding shape. In the illustrated example, the surface 4A is a receptacle surface and the surface 5A is a projecting surface, while it is well understood however that this configuration is provided herein purely by way of example. The same result could be obtained for example by turning the apparatus shown in FIG. 5 upside down and using a lower mould element with a projecting surface and an upper mould element with a receptacle surface. It must be particularly understood that the mould configuration may be of any type.

FIG. 6 shows a detail of the press mould in the closed configuration, with the sheet metal element 1 shaped due to the mechanical deformation caused by closing of the mould.

As shown diagrammatically in FIG. 5, the surface of the upper mould element 5 has surface portions 30 provided with a distribution of asperities corresponding to that which must be obtained on the surface of the metal sheet element 1. In this manner, by the same operation which is required for forming the sheet metal element 1, the above mentioned uneven surface portions 3 which are required for obtaining an optimal joint are also formed, through a mechanical deformation of the metal material of element 1.

The surface portions 30 can be provided directly on surface 5A of the mould element (left-hand portion of FIG. 5) or on an insert I provided within the mould (right-hand portion of FIG. 5).

Figure 7:
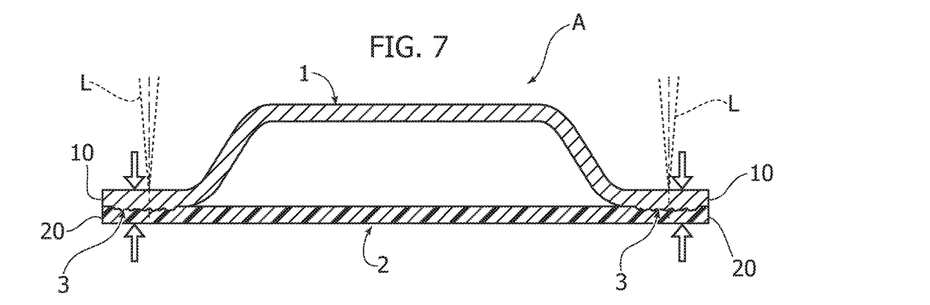
FIG. 7 is a diagrammatic view in cross-section which shows a hybrid component which can be obtained by the method according to the invention and which is constituted by one element of metal material and one element of composite thermoplastic material.

FIG. 7 shows in cross-section a further example of a component A constituted by a sheet metal element 1 and a panel 2 of thermoplastic material with flanges 10, 20 connected to each other by the method according to the invention. Also in this case the application of heat is obtained by a laser beam L and the faces of the flanges 10 of the metal element 1 which are to come in contact with the thermoplastic element 2 are provided with the desired uneven surface portions, as a result of the same preliminary operation for moulding the metal sheet element 1, as already described with reference to FIGS. 5, 6.

A hybrid component of the type shown in FIG. 4 or in FIG. 7 can be constituted by an element 1 of steel or aluminium sheet, and a panel 2 made of any suitable thermoplastic material.

Figure 8:
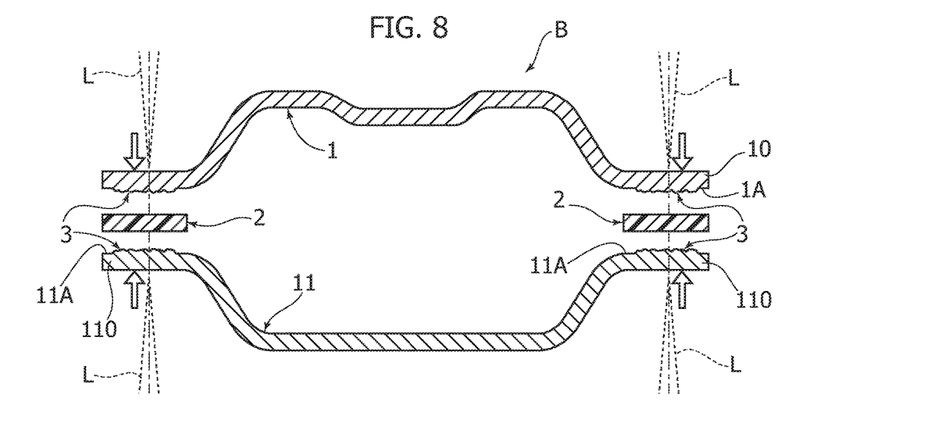
FIG. 8 is a view in cross-section of a further example of a hybrid component which can be obtained by the method according to the invention, in which the component is constituted by two elements of different metal materials.

With reference to FIG. 8, the principle which is at the basis of the present invention can be exploited also for providing hybrid components made of elements of different metal materials. For example, FIG. 8 shows a hybrid component B constituted by a shaped element of steel sheet 1 and a shaped element of aluminium sheet 11. In this embodiment of the invention, the two metal sheet elements 1, 11 have flanges 10, 110 which are connected to each other with the interposition of portions of thermoplastic material 2. Each portion of thermoplastic material 2 is joined both to the respective flange 10 of the steel sheet element 1, and to the respective flange 110 of the aluminium sheet 11 by the method which has been described above. In particular, faces 1A, 11A of the two elements 1, 11 facing towards the portions of thermoplastic material 2 are all provided with one or more uneven surface portions 3, through the technique which has been described above with reference to FIGS. 5, 6. This means that the surface portions 3 having the desired roughness characteristics are obtained by mechanical deformation, during the same moulding operation which is carried out for forming each of the two sheet metal elements 1, 11.

Also in the case of the embodiment of FIG. 8, the heat required for the joint can be applied by any known technique even if the use of a laser beam is preferred, according to what has been described in the foregoing. During the joining operation, the flanges 10, 110 of components 1, 11 of steel sheet and aluminium sheet are pressed against each other, while heat is applied through the laser beam so that the portions of thermoplastic material 2 act as bonding agents filling the spaces between the asperities of the uneven surface portions 3.

In a production line in which the method of the invention according to any of the embodiments shown herein is to be applied, it is not necessary to provide for any dedicated stations for obtaining the uneven surface portions 3 on the metal elements to be joined, since these uneven surface portions are obtained by mechanical deformation in the same moulding station which is provided for forming the metal sheet elements. In the station where the joining operations are performed, means are provided for supporting and pressing against each other the elements to be joined, while one or more multi-axis manipulating robots are provided, each having a laser head for focusing a laser beam on a respective surface of a metal element located on a side opposite to that which is in contact with the corresponding element of thermoplastic material.

Figure 9:
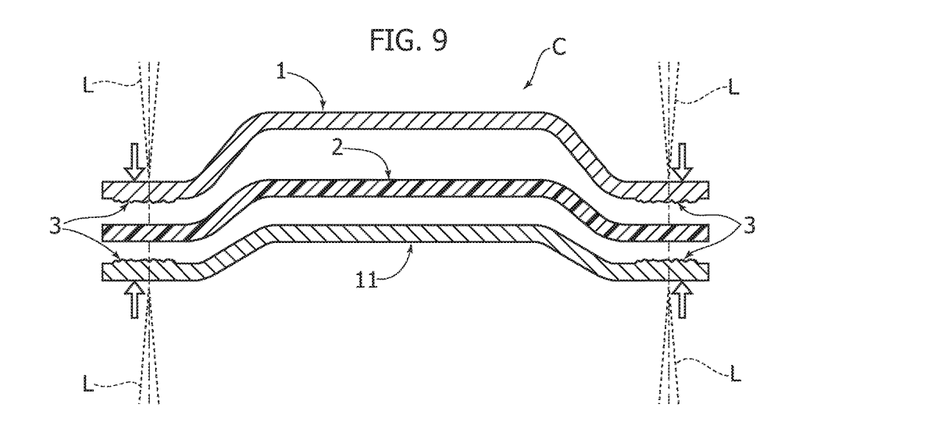
FIG. 9 is a view in cross-section which shows the application of the method according to the invention to a further hybrid component comprising one element of composite thermoplastic material interposed between two elements of metal material, and FIGS. 10-14 diagrammatically show various examples of uneven surfaces which can be obtained on the sheet metal element in the method of the invention.

FIG. 9 shows a further example of a composite component C which can be obtained by the method according to the invention, in which an entire panel of thermoplastic material 2 is interposed between two shaped sheets 1, 11 respectively made both of steel, or both of aluminium, or one of steel and the other of aluminium. Also in this case, the faces of the flanges of the metal elements 1, 11 which face towards the panel of thermoplastic material 2 are formed with uneven surface portions 3 during the moulding operation necessary for forming the elements 1, 11. Similarly to the above described cases, the joining is obtained by pressing the flanges of the sheet elements 1, 11 with the interposition of the corresponding flanges of the panel 2 of thermoplastic material against each other and with simultaneous application of heat, through a laser beam L.

In all the solutions according to the invention which have been described herein, the above mentioned thermoplastic material may be any thermoplastic material suitable for this purpose, but more preferably it is a composite material, comprising a matrix of thermoplastic resin reinforced with fibres (such as glass fibres, or carbon fibres, with dimensions in the orders of millimeters or micrometers, or nanometers).

Figure 10:
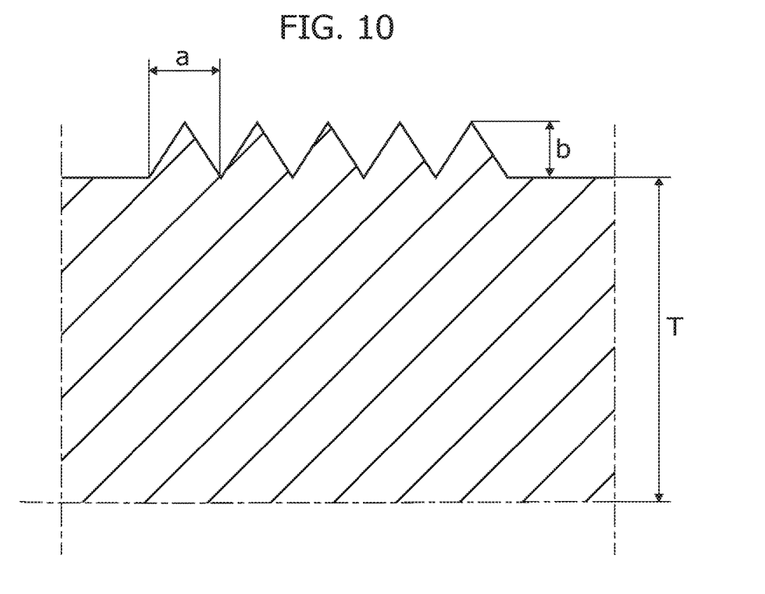
Figure 15:
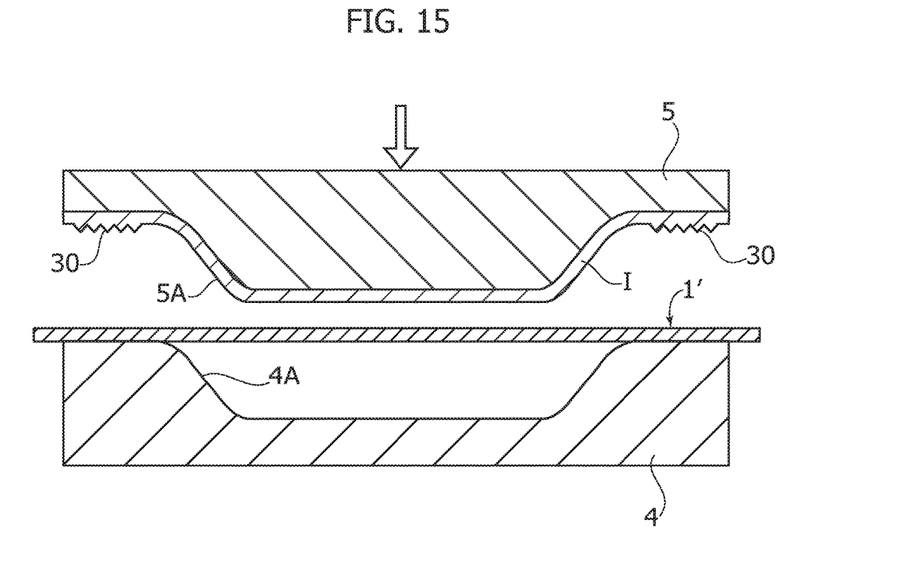
FIGS. 15-18 show further examples of the mould which can be used in the method of the invention, in accordance to further exemplary embodiments.

FIG. 10 of the annexed drawings shows a detail in cross-section, with enlarged proportions, for sake of clarity, of an uneven surface portion which can be obtained on the sheet metal element 1 in the preliminary step for forming the sheet metal element. The illustrated example refers to the case in which the uneven surface is obtained only on the face of the sheet metal element which is to come in contact with the element of plastic material. Moreover, FIG. 10 refers to the case in which width "a" and height "b" of the asperities of the uneven surface obtained on the above mentioned face of the sheet metal element have values which are in the order of micrometers or nanometers, and are anyhow greatly lower than the thickness T of the sheet metal element (which is in the order of millimeters). The uneven surface can be obtained in the preliminary step for forming the sheet metal element, for example by using a mould as shown in FIG. 15. The mould of FIG. 15 is substantially identical to that of FIG. 5, except for that in the case of FIG. 15 an insert I of hard material is provided, which entirely covers the lower surface of the mould upper element and which defines the surface portions 30 which create the surface irregularities on the sheet metal element 1.

Figure 11:
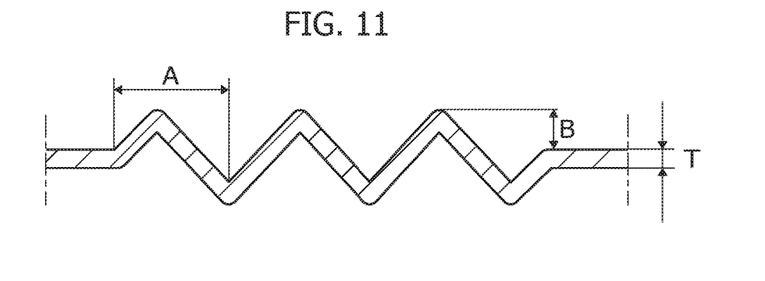

FIG. 11 refers to the case in which uneven surface portions are obtained on both faces of the sheet metal element 1, as a result of a mechanical deformation which confers an undulated shape to the sheet metal element, preferably with a substantially uniform thickness. In this case width A and height B of the asperities created on the two faces of the sheet metal element are macroscopic, in the order of millimeters. The order of magnitude of the value of the height B of the asperities is substantially identical to, or anyhow not much different from, that of the value of thickness T of the sheet metal element.

Figure 16:
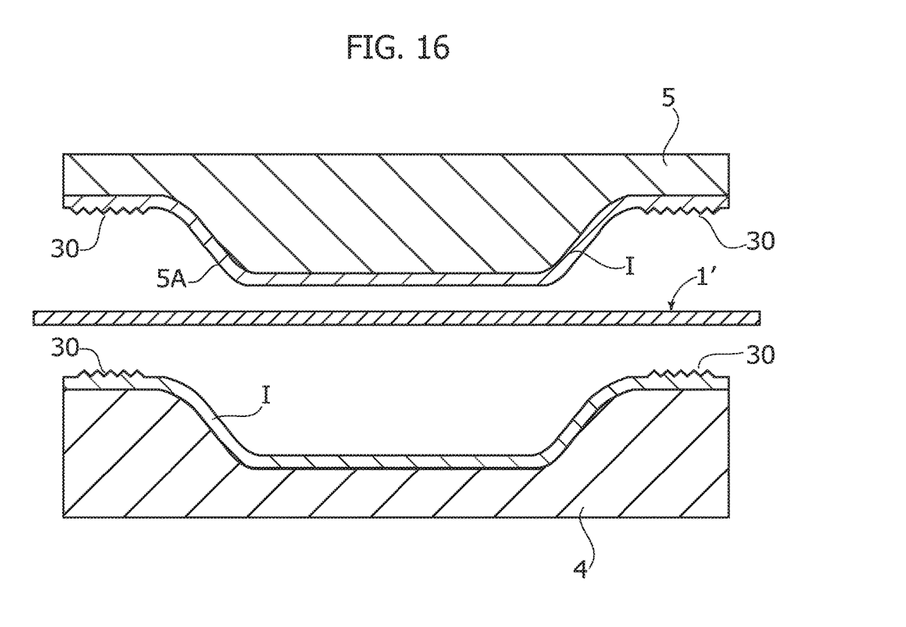

The mechanical deformation shown in FIG. 11 can be obtained in the preliminary step for forming the sheet metal element, for example by using a mould as shown in FIG. 16, in which both the lower mould element 4 and the upper mould element 5 have their active surfaces covered by an insert I of hard material. The two inserts I both have uneven surfaces 30 facing towards each other, which confer the undulated configuration shown in FIG. 11 to the sheet metal element, when element 1 is pressed between the two mould elements 4,5.

Figure 12:
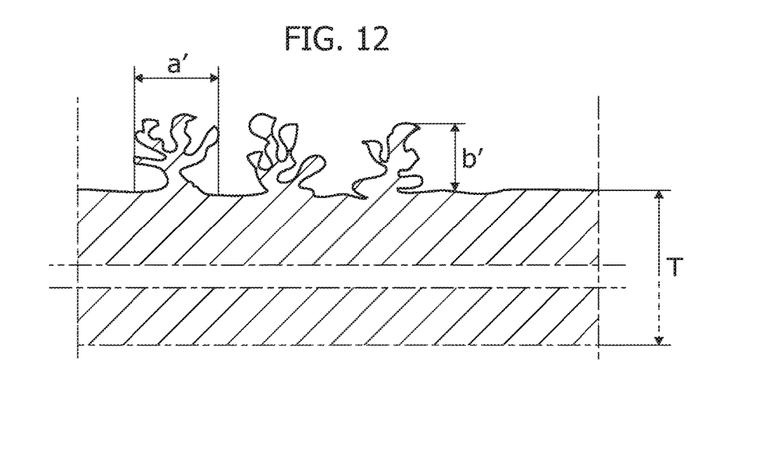
Figure 17:
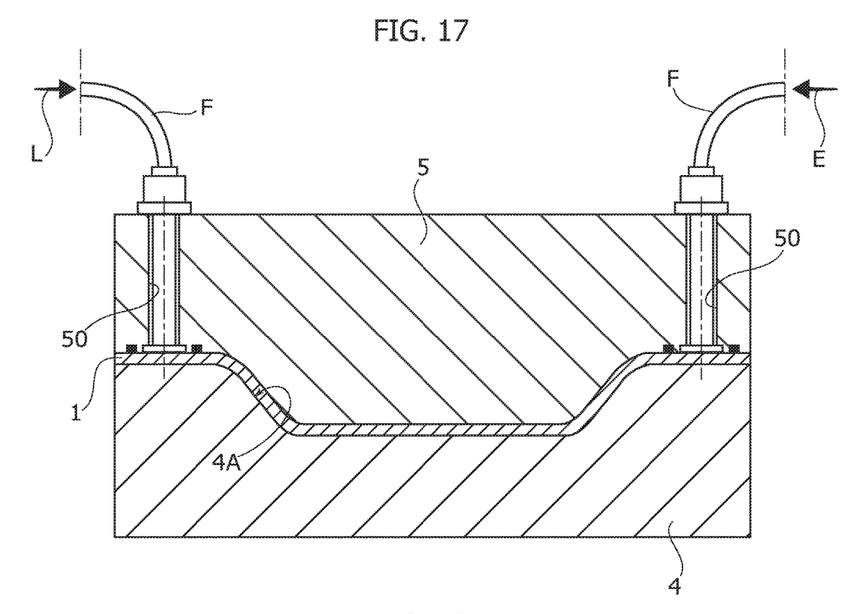
Figure 18:
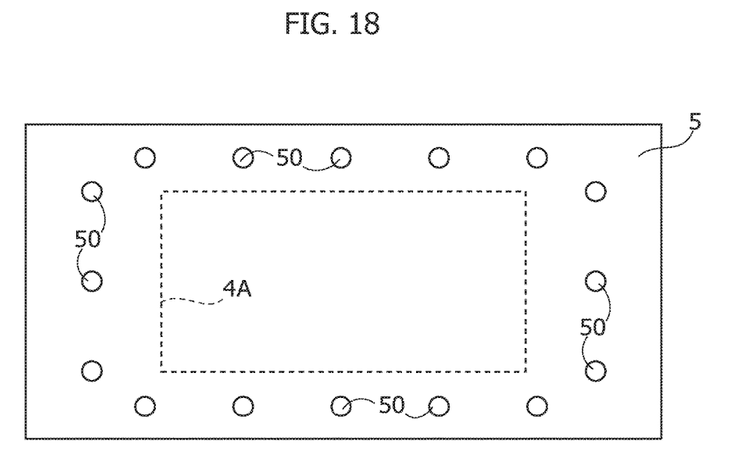

Alternatively to the above described embodiments, the uneven surfaces on the sheet metal element may be obtained during the preliminary step for forming the sheet metal element, by providing the mould with a device for guiding and addressing a laser beam or an electron beam adapted to generate said uneven surface portion by evaporation and solidification of the metal material. FIG. 17 diagrammatically shows a mould provided with devices of this type, and FIG. 18 is a diagrammatic plan view of the mould of FIG. 17. The upper mould element 5 has a number of vertical through channels 50 arranged along the periphery of the mould (see the plan view of FIG. 18), through which optical guides F of any known type (for example beams of optical fibres) are arranged for guiding and addressing, against the metal surface to be rendered uneven (see the left-hand part of FIG. 17), a laser beam L coming from a laser generator (not shown) or an electron beam (e-beam) coming from a generator of any known type (not shown) and propagating in vacuo. In both cases, the beam heats the metal surface, causing evaporation of metal particles, which are then allowed to be cooled down, so as to give rise to irregular microscopic projections of the type shown in FIG. 12. In this case, the width a' and height b' of the asperities are in the order of nanometers or micrometers and are significantly lower than the value of thickness T of the sheet metal element.

Still with reference to FIG. 17, in case an electron beam is used, this beam must propagate in vacuo, as known to persons skilled in this field. This implies that the electron beam is addressed against the surface of the sheet metal element 1 after that the mould has been closed. If instead a laser beam is used, this beam can be addressed against the surface of the sheet metal element when the mould is still opened. In this case it can be envisaged that the optical guide for the laser beqam is movable to a position projecting below the upper mould element 5, when the mould is open, so as to be adjacent to the metal surface against which the laser beam must be addressed.

Figure 13:
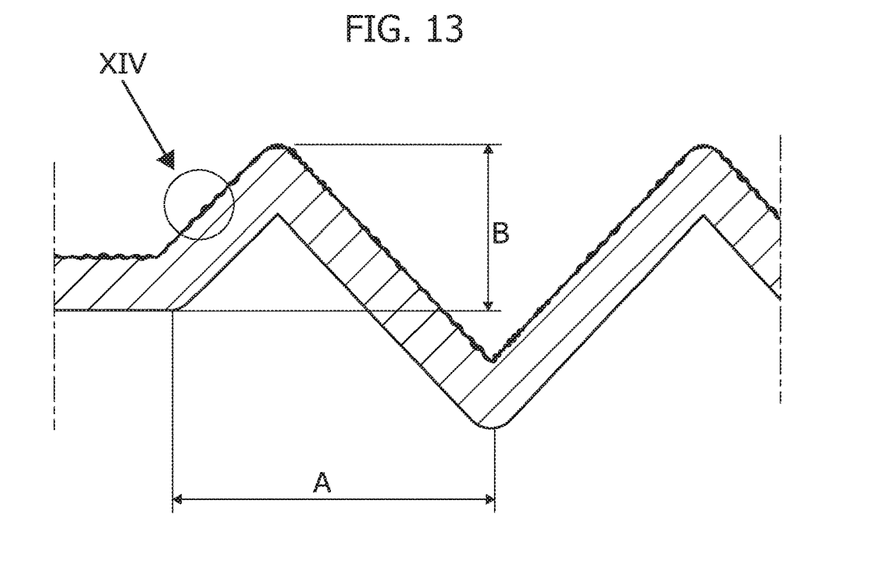
Figure 14:
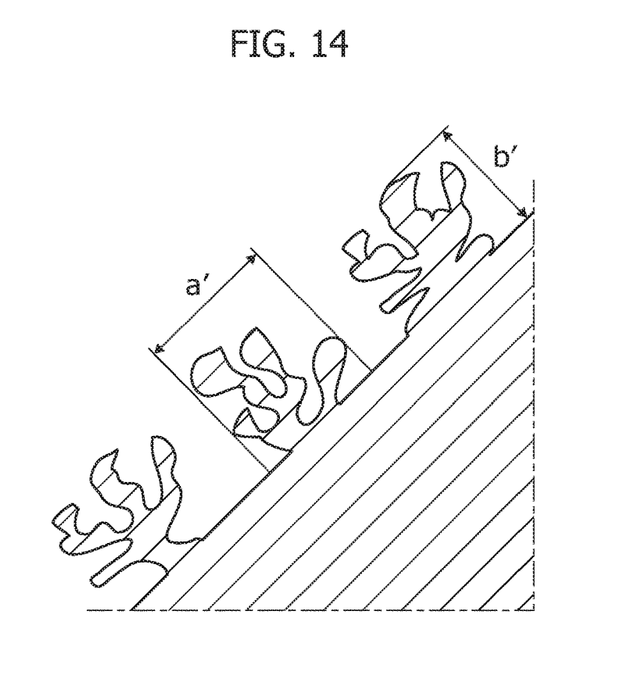

According to the invention, a mould can also be provided which is able to form both macroscopic surface irregularities, for example through the use of inserts I of the type shown in FIGS. 15 and 16, and also micrometric surface irregularities, by providing the mould with a device for guiding and addressing a laser beam or an electron beam. In this case a sheet metal element can be obtained having the configuration shown in FIGS. 13 and 14 (FIG. 14 shows the detail of arrow XIV in FIG. 13 at an enlarged scale).

Naturally, while the principle of the invention remains the same, the details of construction and the embodiments may widely vary with respect to what has been described and illustrated purely by way of example, without departing from the scope of the present invention.

What is claimed is:

1. A method for obtaining a welded joint between elements of different materials, wherein the welded joint comprises at least one element of metal material and at least one element of thermoplastic material having respective contact surfaces, wherein said contact surfaces of said at least one element of metal material and said at least one element of thermoplastic material are pressed against each other with simultaneous application of heat, wherein the contact surface of said at least one metal element has at least one uneven surface portion, wherein said at least one uneven surface portion has a distribution of asperities, wherein said application of heat is such as to generate a softening of the thermoplastic material, so that said thermoplastic material fills spaces between the asperities of said uneven surface portion and maintains this configuration after a subsequent cooling, wherein said at least one element of metal material is a shaped component of a sheet metal element, which is obtained in a preliminary shaping step by mechanical deformation in a press mould, and wherein said at least one uneven surface portion is obtained by mechanical deformation in said press mould during said preliminary forming step for shaping said at least one element of metal material in said press mould.

2. The method according to claim 1, wherein said mould is provided with a forming surface adapted to create said at least one uneven surface portion by a mechanical deformation of the metal material when said at least one element of metal material is deformed within said mould.

3. The method according to claim 2, wherein said forming surface of the press mould is provided directly on one element of the press mould.

4. The method according to claim 2, wherein said forming surface is provided on an insert which is associated to a press mould element.

5. The method according to claim 2, wherein said asperities of said at least one uneven surface portion, which is obtained by a mechanical deformation, have height and width values between a minimum value in the order of manometers and a maximum value in the order of millimeters.

6. The method according to claim 1, wherein said mould is provided with a device for guiding and addressing a laser beam or an electron beam adapted to generate said at least one uneven surface portion of the at least one element of metal material by evaporation and subsequent solidification of the metal material, when the at least one element of metal material is located within the mould.

7. The method according to claim 6, wherein said asperities of said at least one uneven surface portion, which is obtained by a laser beam or an electron beam, have height and width values between a minimum value in the order of manometers and a maximum value in the order of micrometers.

8. The method according to claim 1, wherein said mould is provided with a forming surface adapted to create said at least one uneven surface portion by a mechanical deformation of the metal material when said at least one element of metal material is deformed within said mould and wherein said mould is also provided with a device for guiding and addressing a laser beam or an electron beam adapted to generate secondary irregularities on said at least one uneven surface portion which is obtained by mechanical deformation.

9. The method according to claim 1, wherein said at least one uneven surface portion is formed only on one face of said sheet metal element which is provided for coming in contact with said at least one element of thermoplastic material.

10. The method according to claim 1, wherein said at least one uneven surface portion is formed on both faces of said sheet metal element, as a result of a mechanical deformation of said sheet metal element in said mould.

11. The method according to claim 10, wherein the mechanical deformation of said sheet metal element in said mould confers an undulated shape with a substantially uniform thickness to the sheet metal element.

12. The method according to claim 11, wherein a height of the asperities of said at least one uneven surface portion, which is obtained by mechanical deformation of said sheet metal element, is substantially similar to a thickness of the sheet metal element.

13. The method according to claim 1, wherein said application of heat is obtained by a laser beam.

14. The method according to claim 13, wherein said laser beam is emitted by a laser head carried by a multi axis manipulating robot.

15. The method according to claim 13, wherein the laser beam is directed against a surface of said at least one element of metal material located on a side opposite with respect to said contact surface.

16. The method according to claim 1, wherein said welded joint comprises two elements of different metal materials with the at least one element of thermoplastic material interposed therebetween; the contact surface of each of said two elements of different metal materials facing towards said interposed element of thermoplastic material being provided with one or more uneven surface portions obtained in the preliminary forming step of said two elements of different metal materials in respective moulds.

17. The method according to claim 1, wherein said thermoplastic material is a composite material including a thermoplastic matrix reinforced with fibres.

18. A hybrid component, comprising an element of metal sheet and a panel of thermoplastic material having respective flanges connected to each other by the method according to claim 1.

19. A hybrid component according to claim 18, wherein said thermoplastic material is a composite material with a thermoplastic matrix reinforced with fibres.

20. A hybrid component, comprising two elements of metal sheet and a panel of thermoplastic material interposed between said elements of metal sheet, each element of metal sheet being connected to said panel of thermoplastic material by the method according to claim 1.

21. A hybrid component made of two elements of different metal materials connected to each other with the interposition of one or more portions of thermoplastic material, wherein each element of metal material is joined to a respective portion of thermoplastic material by the method according to claim 1.

* * * * *